US010657729B2

(12) United States Patent
Bosch et al.

(10) Patent No.: US 10,657,729 B2
(45) Date of Patent: May 19, 2020

(54) VIRTUAL VIDEO PROJECTION SYSTEM TO SYNCH ANIMATION SEQUENCES

(71) Applicant: Trimble Inc., Sunnyvale, CA (US)

(72) Inventors: Augusto Op den Bosch, Alpharetta, GA (US); Paula Kohan, Cumming, GA (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 16/164,153

(22) Filed: Oct. 18, 2018

(65) Prior Publication Data

US 2020/0126299 A1 Apr. 23, 2020

(51) Int. Cl.
*G06T 19/20* (2011.01)
*G06T 7/73* (2017.01)
*G06T 13/20* (2011.01)
*G06T 7/80* (2017.01)
*H04N 5/232* (2006.01)

(52) U.S. Cl.
CPC .............. *G06T 19/20* (2013.01); *G06T 7/75* (2017.01); *G06T 7/80* (2017.01); *G06T 13/20* (2013.01); *H04N 5/23216* (2013.01); *G06T 2207/10028* (2013.01)

(58) Field of Classification Search
CPC .................................................. G06T 19/003
See application file for complete search history.

(56) References Cited

U.S. PATENT DOCUMENTS

| | | | | |
|---|---|---|---|---|
| 2005/0215879 | A1* | 9/2005 | Chuanggui | G06T 7/001 600/407 |
| 2010/0245387 | A1* | 9/2010 | Bachelder | G06T 19/006 345/633 |
| 2011/0043627 | A1* | 2/2011 | Werling | G06T 17/05 348/143 |
| 2013/0218542 | A1* | 8/2013 | Yerli | G06F 17/5009 703/6 |
| 2014/0192159 | A1* | 7/2014 | Chen | G06T 15/20 348/46 |
| 2015/0062123 | A1* | 3/2015 | Yuen | G06T 19/006 345/420 |
| 2015/0086181 | A1* | 3/2015 | Mariani | G06T 19/003 386/241 |
| 2016/0205379 | A1* | 7/2016 | Kurihara | G06T 19/00 348/47 |
| 2017/0318283 | A1* | 11/2017 | Watson | H04N 13/366 |
| 2018/0061138 | A1* | 3/2018 | Neeter | G06T 19/006 |

(Continued)

*Primary Examiner* — Phi Hoang
(74) *Attorney, Agent, or Firm* — Kilpatrick Townsend & Stockton LLP (57) ABSTRACT

A method of synchronizing an animation sequence with a video includes placing a virtual camera in a 3D model of a site captured in the video at the same location and the same orientation as those of a video camera that captured the video, generating a set of virtual frames of the animation sequence by projecting the 3D model onto a scene frame from a viewpoint of the virtual camera, for each of a plurality of virtual key frames, placing a virtual object corresponding to a moving object captured in the video in the 3D model at a respective location that matches with the respective position of the moving object in a corresponding key frame of the video, and playing the set of virtual frames by stepping through time such that the plurality of virtual key frames is in synch with the plurality of key frames of the video.

18 Claims, 12 Drawing Sheets

(56) References Cited

U.S. PATENT DOCUMENTS

2018/0089203 A1\* 3/2018 Soni .................... G06F 16/7837
2019/0102939 A1\* 4/2019 He ........................ G06T 19/003
2019/0369837 A1\* 12/2019 Davis .................... H04N 7/157

\* cited by examiner

VIRTUAL VIDEO PROJECTION SYSTEM TO SYNCH ANIMATION SEQUENCES

BACKGROUND

Crime scene reconstruction (including accident scene reconstruction) is the forensic science discipline in which one gains knowledge of the series of events that surround the commission of a crime using deductive and inductive reasoning, physical evidence, scientific methods, and their interrelationships. Crime scene reconstruction may involve evaluating the context of a scene and the physical evidence found there in an effort to identify what occurred and in what order it occurred. Traditional systems used to re-create a sequence of events in a crime may rely on measurements and human interpretation to infer positions of objects and people involved in the crime as a function of time. This approach may have credibility issues that may make it difficult for such inferences to be admitted as evidence.

SUMMARY

According to some embodiments, a method of synchronizing an animation sequence with a video footage includes obtaining a digital three-dimensional (3D) model of a site captured in the video footage by a video camera installed in the site. The video footage includes a plurality of key frames. A moving object is at a respective position in a respective key frame of the plurality of key frames. The method further includes placing a first virtual camera in the 3D model at a first location and a first orientation corresponding to a location and an orientation of the video camera in the site. The first virtual camera has a first set of camera parameters that are substantially same as a set of camera parameters of the video camera. The method further includes generating a first set of virtual frames of the animation sequence by projecting the 3D model onto a first scene frame from a viewpoint of the first virtual camera using the first set of camera parameters. The first set of virtual frames includes a first plurality of virtual key frames. Each virtual key frame corresponds to a respective key frame in the video footage. The method further includes, for each respective virtual key frame, placing a virtual object corresponding to the moving object in the 3D model at a respective location that matches with the respective position of the moving object in a corresponding key frame, and playing the first set of virtual frames of the animation sequence by stepping through time such that the first plurality of virtual key frames is in synch with the plurality of key frames of the video footage.

According to some embodiments of the present invention, a system for synchronizing an animation sequence with a video footage includes a memory for storing a digital three-dimensional (3D) model of a site captured in the video footage by a video camera installed in the site. The video footage includes a plurality of key frames. A moving object is at a respective position in a respective key frame of the plurality of key frames. The system further includes a projection module configured to place a first virtual camera in the 3D model at a first location and a first orientation corresponding to a location and an orientation of the video camera in the site. The first virtual camera has a first set of camera parameters that are substantially same as a set of camera parameters of the video camera. The system further includes a processor configured to generate a first set of virtual frames of the animation sequence by projecting the 3D model onto a first scene frame from a viewpoint of the first virtual camera using the first set of camera parameters. The first set of virtual frames includes a first plurality of virtual key frames. Each virtual key frame corresponds to a respective key frame in the video footage. The system further includes an interpolator configured to, for each respective virtual key frame, place a virtual object corresponding to the moving object in the 3D model at a respective location that matches with the respective position of the moving object in a corresponding key frame. The system further includes a key-frame timer for synchronizing playing of the first set of virtual frames of the animation sequence with the video footage, such that the first plurality of virtual frames is in synch with the plurality of key frames of the video footage.

DETAILED DESCRIPTION

Embodiments of the present invention provide a virtual video projection system for projecting images of a surveillance video onto a three-dimensional (3D) model of a crime scene (or accident scene). The 3D model may be animated to re-create a sequence of events that happened in the crime. An animation sequence may be created using key frames identified in the surveillance video. A key-frame timer may be fed into the animation playback so that the animation is synchronized with the surveillance video. By projecting images of the surveillance video onto the 3D model and synchronizing the animation sequence with the surveillance video, it may be more credible that the animation correctly depicts the events unfolding in the surveillance video. Since surveillance videos are admissible in courts, animations created according to embodiments of the present invention may also be admitted as evidence.

Figure 1:
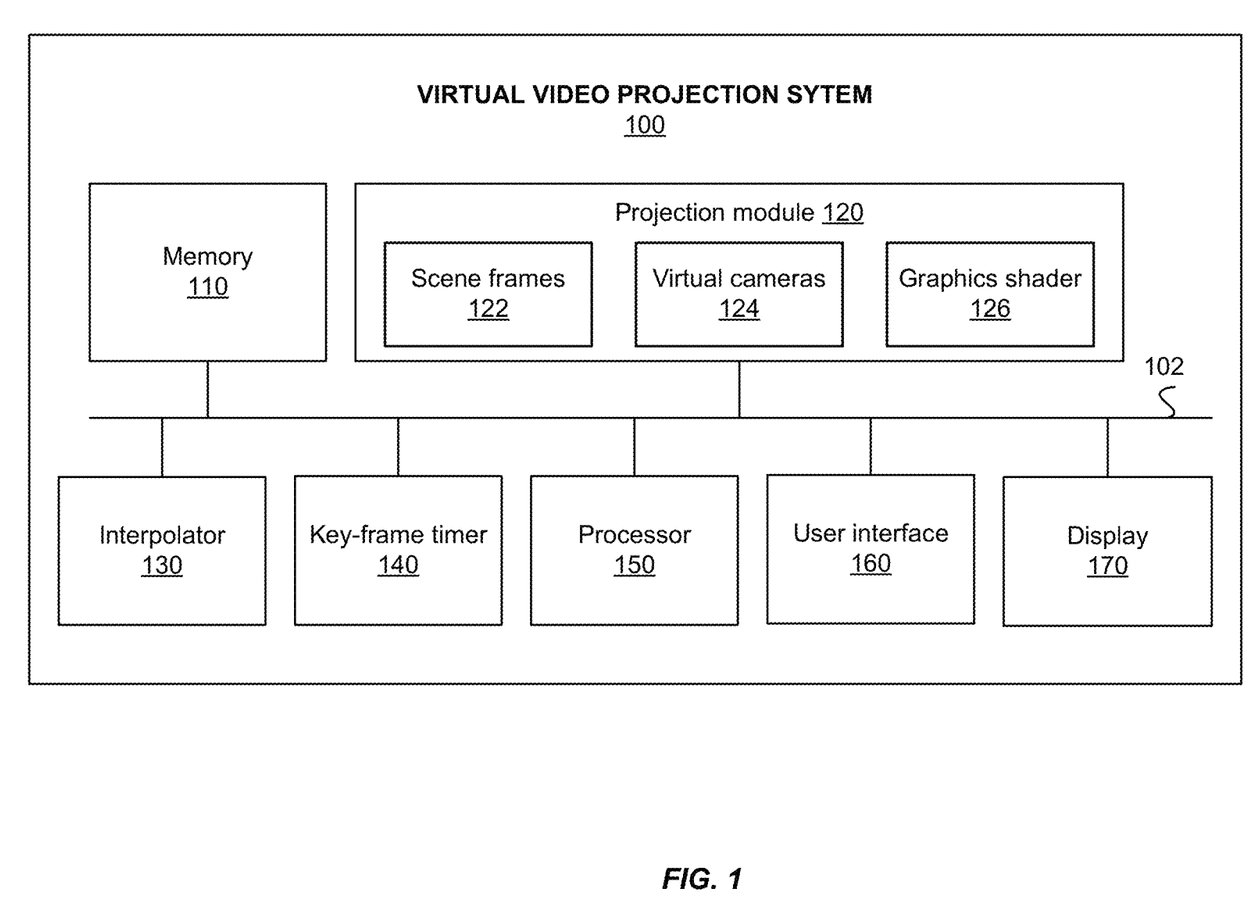
FIG. 1 shows a schematic block diagram of a virtual video projection system according to some embodiments of the present invention.

FIG. 1 shows a schematic block diagram of a virtual video projection system 100 according to some embodiments. The virtual video projection system 100 may include a computer memory 110. The memory 110 may store a digital 3D model of a crime site. The digital 3D model may be obtained, for example, by scanning the crime site using a 3D imaging system, such as a laser scanner. In a time-of-flight laser scanner, a laser pulse may be emitted from the laser scanner toward an object and reflected back by the object. The distance from the object to the laser scanner may be determined by measuring the time-of-flight of the laser pulse from emission to detection. Thus, an x, y, and z coordinate of a point may be determined. A laser scanner may acquire a large number of such points, which forms a point cloud. The x, y, and z coordinates of the points in the point cloud may represent surfaces of objects. The point cloud may be colorized using color photographs of the same scenes. Other exemplary 3D imaging systems may include triangulation-based 3D laser scanners, structured-light 3D scanners, modulated-light 3D scanners, stereophotogrammetry systems, and the like. A 3D model may also be obtained using computer-generated geometrical shapes, or from a computer-added design (CAD) model (e.g., a CAD model of a building), according to various embodiments. The memory 110 may also store video footages captured by, for example, a surveillance camera installed at the crime site.

The virtual video projection system 100 further includes a projection module 120. The projection module 120 may include scene frames 122 and virtual cameras 124. A scene frame 122 may be defined by a frame area, a position, and an orientation. The projection module 120 may be configured to create a virtual scene of the 3D model by projecting the 3D model onto a scene frame 122 by placing a virtual camera 124 in the 3D model. The location of a virtual camera 124 may be defined by x, y, and z coordinates, and the orientation of a virtual camera 124 may be defined by pitch, yaw, and roll angles. A virtual camera 124 may have a set of camera parameters, including for example a focal length, an aspect ratio, and a field of view. The set of camera parameters may also include an optical center, a principal point (or principal points), calibration parameters for correcting distortions, and the like.

According to some embodiments, to create a virtual scene corresponding to images of a video footage captured by a surveillance camera, a virtual camera 124 may be placed in the 3D model at the same location and the same orientation as the surveillance camera. In addition, the virtual camera 124 may have the same camera parameters as those of the surveillance camera. Therefore, when the virtual scene created in this manner is superimposed on the images of the video footage, stationary objects (e.g., roads and street signs) may be aligned or overlap.

The projection module 120 may further include a graphics shader 126 in some embodiments. After a virtual scene that corresponds to a video frame has been created, the graphics shader 126 may render the image of the video frame onto the surfaces of those virtual objects that are present in the virtual scene. That is, the graphics shader 126 may provide rendering instructions to drape the pixels from the video frame onto the surfaces of those virtual objects.

According to some embodiments, to create an animation sequence of the 3D model that corresponds to the video footage, a number of key frames may be identified in the video footage. Each key frame may represent a specific moment in the sequence of events that is captured in the video footage. For example, in a car crash accident, a first key frame may correspond to a first moment when a car was at a first location, a second key frame may correspond to a second moment when the car was at a second location, and so on and so forth. As another example, in a burglary crime happened in a store, a first key frame may correspond to a first moment when a perpetrator entered the store, and second key frame may correspond to a second moment when the perpetrator was at the cash register.

The virtual video projection system 100 may further include an interpolator 130. To create virtual key frames in the animation sequence that correspond to the key frames identified in the video footage, the interpolator 130 may, for each respective virtual key frame, position a virtual object in the 3D model at the same position as a corresponding object in a corresponding key frame of the video footage. For instance, in a car crash example, a virtual car may be placed at the same location in each virtual key frame as a car in a corresponding key frame of the video footage.

The virtual video projection system 100 may further include a key-frame timer 140. The key-frame timer 140 may feed the timings of the key frames of the video footage into the projection module 120 to ensure that the animation sequence is played in synch with the video footage.

By projecting the surveillance video onto the 3D model and synchronizing the animation sequence with the surveillance video as described above, it may be more credible that the animation correctly depicts the events unfolding in the surveillance video. As such, the animation may more likely be admitted into evidence in courts.

According to some embodiments, once an animation sequence corresponding to the video footage has been created, other animation sequences may be created from the 3D model from other perspectives. For instance, in the car crash example, a virtual camera may be placed inside the car to create an animation of the same sequence of events from the perspective of the driver. In the store burglary example, a virtual camera may be placed at the cash register to create an animation from the perspective of a cashier at the cash register. Thus, animations of a 3D model of a crime scene may provide more information about the environment and the context of a crime.

The virtual video projection system 100 may include a computer processor 150 for performing some or all of the tasks described above. The virtual video projection system 100 may further include a user interface 160. The user interface 160 may allow a user (e.g., a graphics artist or a prosecutor presenting the animations) to control the creation and playing of animations. For example, the user interface 160 may allow a user to place a virtual camera at a certain location in the 3D model. The virtual video projection system 100 may further include a display 170 for playing an animation sequence. In some embodiments, the display 170 may be part of the user interface 160. The various parts of the virtual video projection system 100 may be interconnected via a system bus 102 or may be direct connected with each other.

Although various parts of the virtual video projection system 100 are described as separate parts, some parts may be integrated into one component, or certain part may be a sub-component of another part. One of ordinary skill in the art would recognize many variations, alternatives, and modifications.

It should be understood that any of the embodiments of the present invention can be implemented in the form of control logic using hardware (e.g. an application specific integrated circuit or field programmable gate array) and/or using computer software with a generally programmable processor in a modular or integrated manner. Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission. Suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

In the following, the operation of the virtual video projection system 100 is illustrated in an exemplary embodiment in which the virtual video projection system 100 is used to reconstruct a sequence of events in a car crash.

Figure 2A:
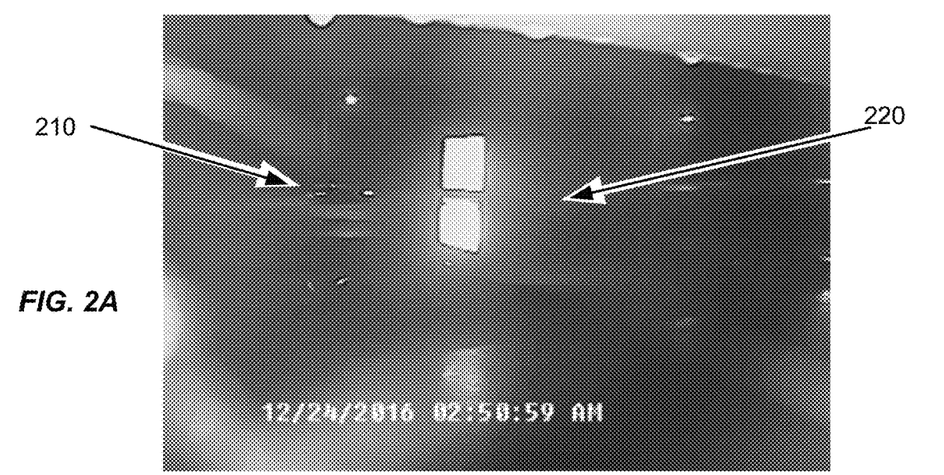
FIGS. 2A-2C show three snapshots of a video footage captured by a surveillance camera.
Figure 2B:
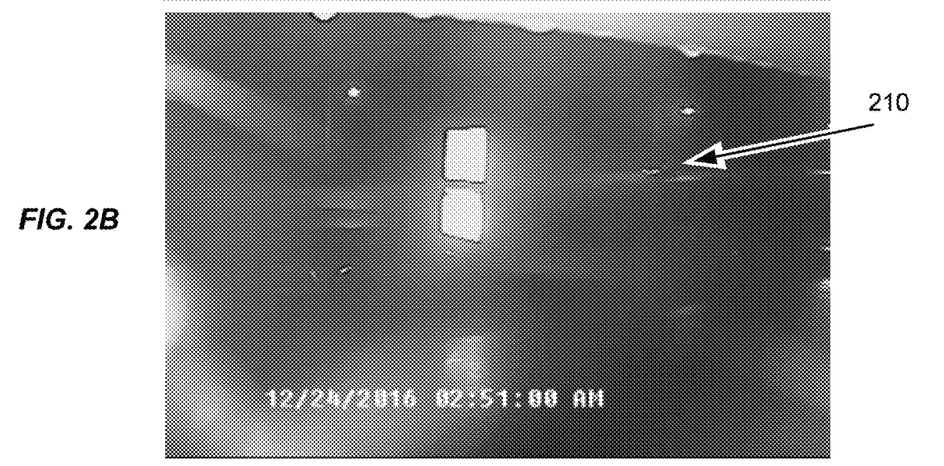
Figure 2C:
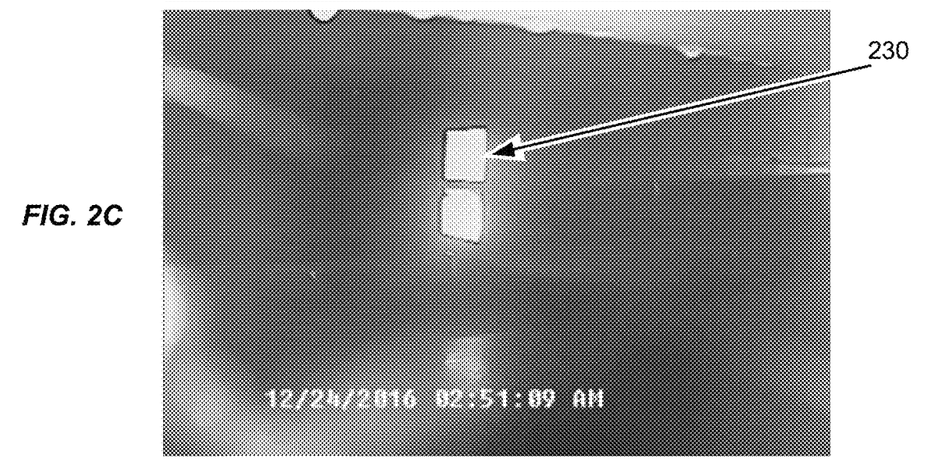

FIGS. 2A-2C show three snapshots of a video footage of a vehicle crash scene in Ohio captured by a surveillance camera. A car 210 driving on a road 220 enters the scene at a first moment (e.g., at about 2:50:59 am) as shown in the snapshot of FIG. 2A, and exits the scene at a second moment a fraction of a second later (e.g., at about 2:51:00 am) as shown in the snapshot of FIG. 2B. A short moment later (e.g., at about 2:51:09), a flash of light appears in the video footage, as shown in the snapshot of FIG. 2C (i.e., the blue light on the right side of the scene). The flash of light is caused by a crash that happened to the car 210 a short distance from where it exited the video footage.

To re-create the sequence of events of the crash, a realist 3D model of the crash site may be obtained. For example, the 3D model may be obtained by scanning the crash site using a 3D imaging system, such as a laser scanner. From the 3D model, virtual scenes may be created using virtual cameras placed in the 3D model.

Figure 3:
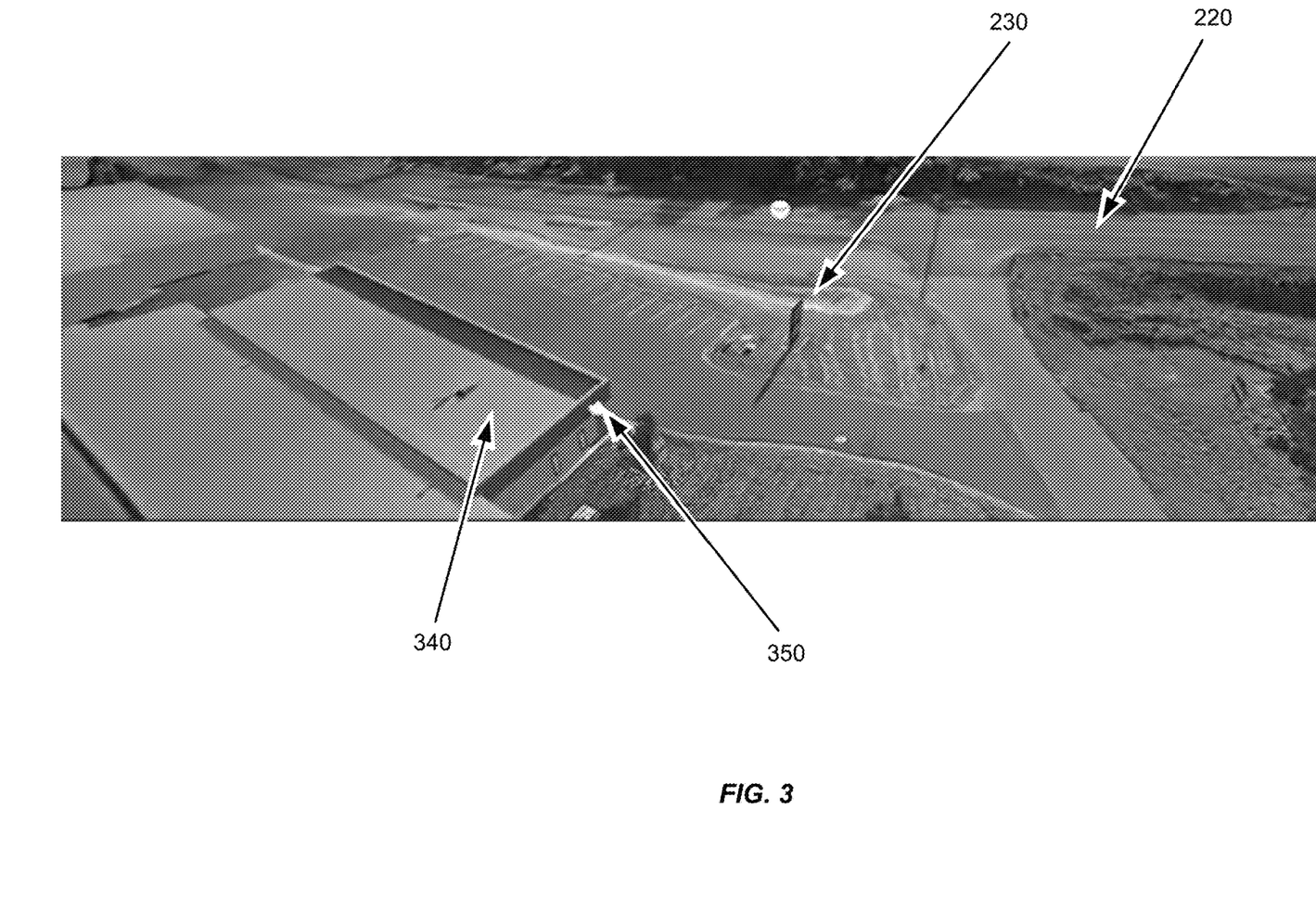
FIG. 3 shows a virtual scene created from a 3D model of the site captured by the video footage shown in FIGS. 2A-2C, according to some embodiments of the present invention.

FIG. 3 shows a virtual scene of the crash site created from a 3D model that was obtained by scanning the crash site using a laser scanner. The virtual scene includes the road 220 that the car 210 traveled through in the video footage shown in FIGS. 2A-2C. The virtual scene also includes the street sign 230 captured in the video footage (which appears as two bright rectangles under the night lighting in FIGS. 2A-2C).

Figure 4:
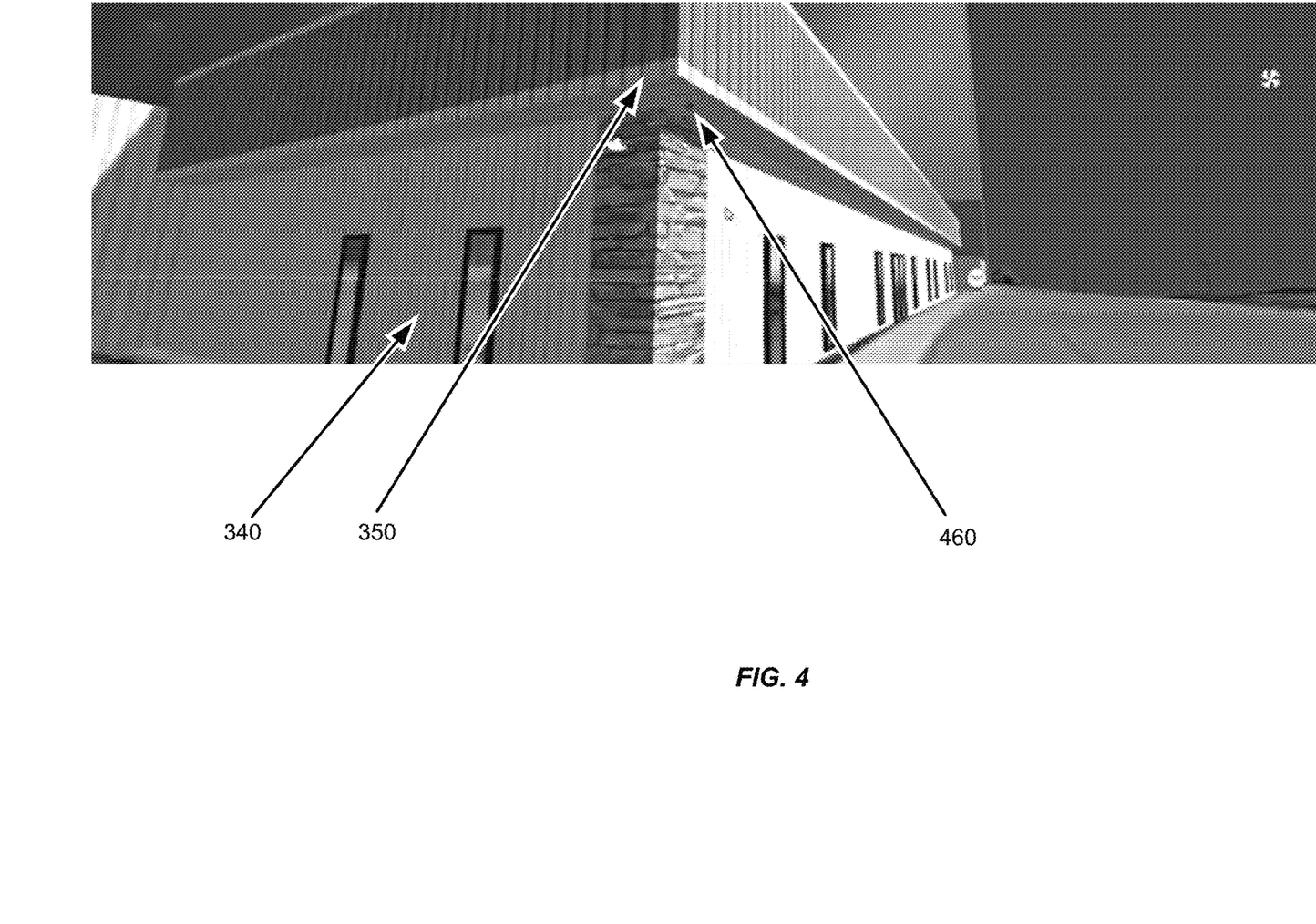
FIG. 4 shows another virtual scene of the 3D model, which shows the surveillance camera that captured the video footage shown in FIGS. 2A-2C, according to some embodiments of the present invention.

The virtual scene shown in FIG. 3 also includes a building 340. The surveillance camera that captured the video footage was installed under the roof of the building 340 at a corner 350 of the building 340. FIG. 4 shows another virtual scene of the 3D model from another virtual camera location, which shows the surveillance camera 460 installed under the roof of the building 340 at the corner 350. Using the actual location of the surveillance camera 460, a virtual scene corresponding to the video footage may be created by placing a virtual camera at the same location.

As discussed above with reference to FIG. 1, the projection module 120 may create a virtual scene from the 3D model that corresponds to the video footage by placing a virtual camera at the same location and the same orientation as those of the surveillance camera 460. The location of the virtual camera may be defined by x, y, and z coordinates in the 3D model, and the orientation of the virtual camera may be defined by pitch, yaw, and roll angles. The virtual camera may also have the same camera parameters (e.g., focal length, field of view, aspect ratio, and the like) as those of the surveillance camera 460.

Figure 5A:
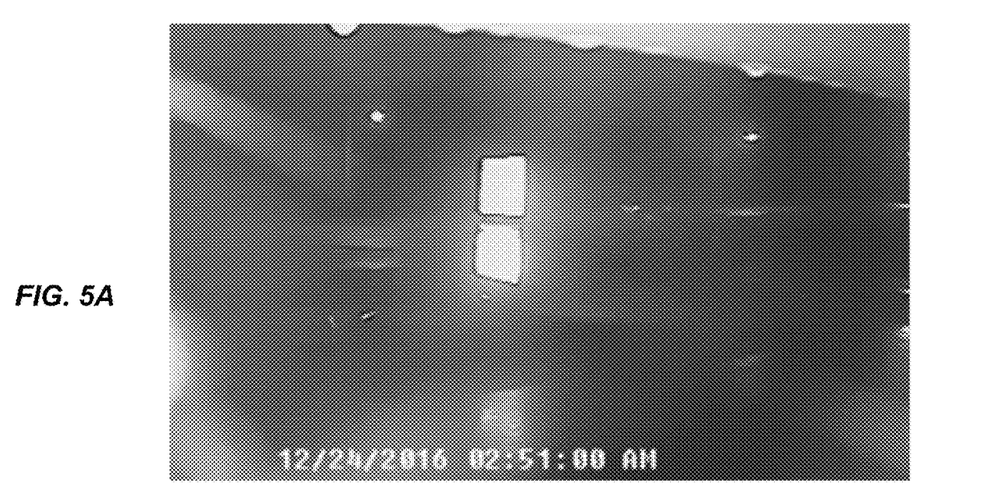
FIG. 5A shows a video frame from the video footage shown in FIGS. 2A-2C.
Figure 5B:
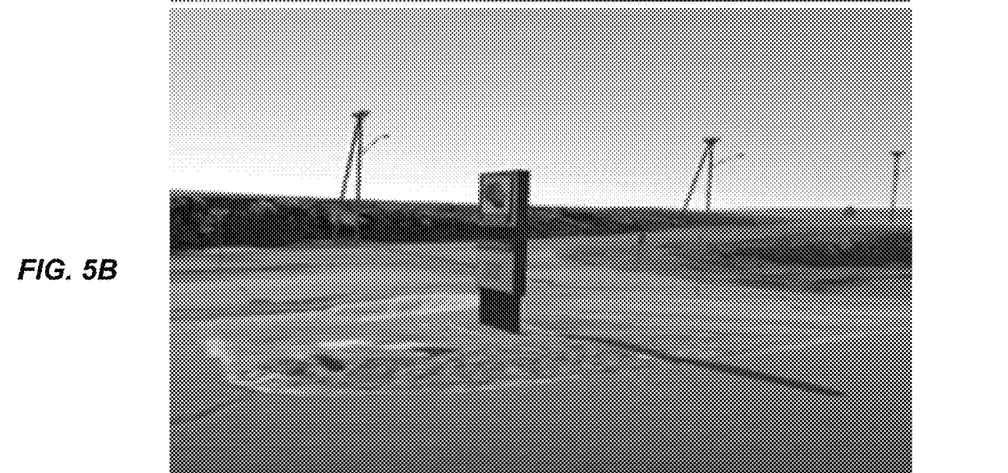
FIG. 5B shows a virtual scene created from the 3D model by placing a virtual camera in the 3D model at the same location and orientation as those of the surveillance camera, according to some embodiments of the present invention.
Figure 5C:
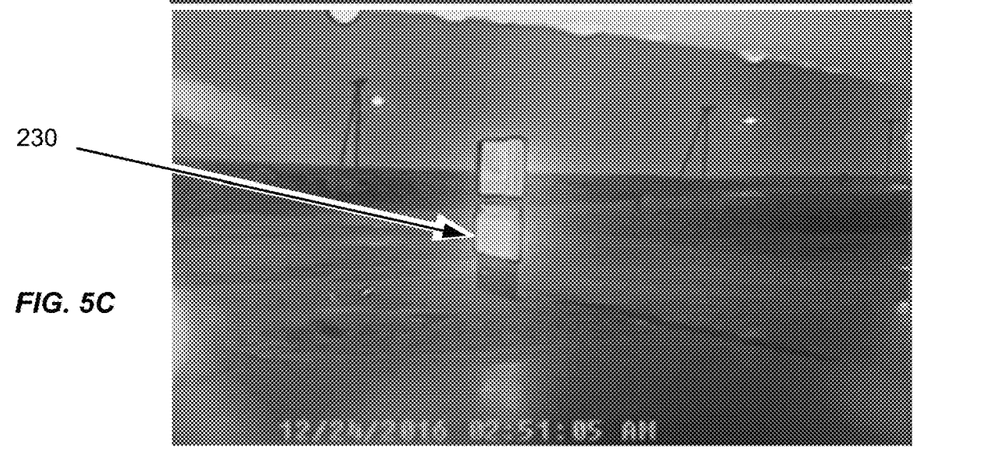
FIG. 5C shows an overlay of the virtual scene shown in FIG. 5B on top of the video frame shown in FIG. 5A.

FIG. 5A shows a video frame from the video footage. FIG. 5B shows a virtual scene created from the 3D model by placing a virtual camera in the 3D model at the same location and the same orientation as those of the surveillance camera 460. FIG. 5C shows an overlay of the virtual scene shown in FIG. 5B on top of the video frame shown in FIG. 5A. Because the virtual scene is created from the same vantage point as the surveillance camera 460 using the same camera parameters, the stationary objects (e.g., the street sign 230) that appeared in the video frame are aligned with the virtual objects in the virtual scene.

Figure 6:
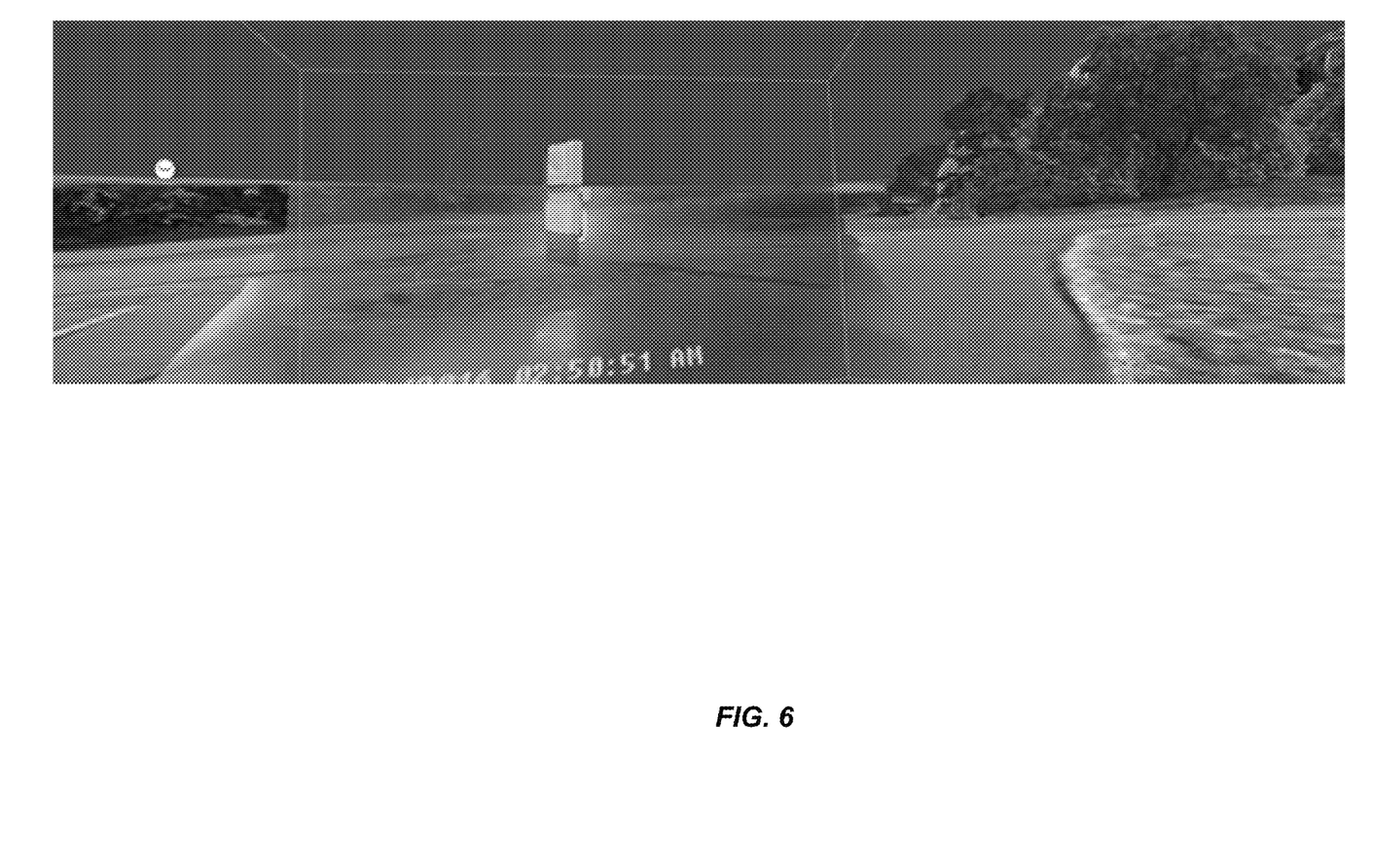
FIG. 6 shows a virtual scene where the pixels of the video frame shown in FIG. 5A have been rendered onto the surfaces of the virtual objects in the 3D model, according to some embodiments of the present invention.

As discussed above with reference to FIG. 1, once the virtual scene corresponding to the video frame is created, the graphics shader 126 may render the pixels of the video frame onto the surfaces of those virtual objects that are present in the video frame. FIG. 6 shows a virtual scene where the pixels of the video frame shown in FIG. 5A have been rendered onto the surfaces of the virtual objects in the 3D model.

Figure 7:
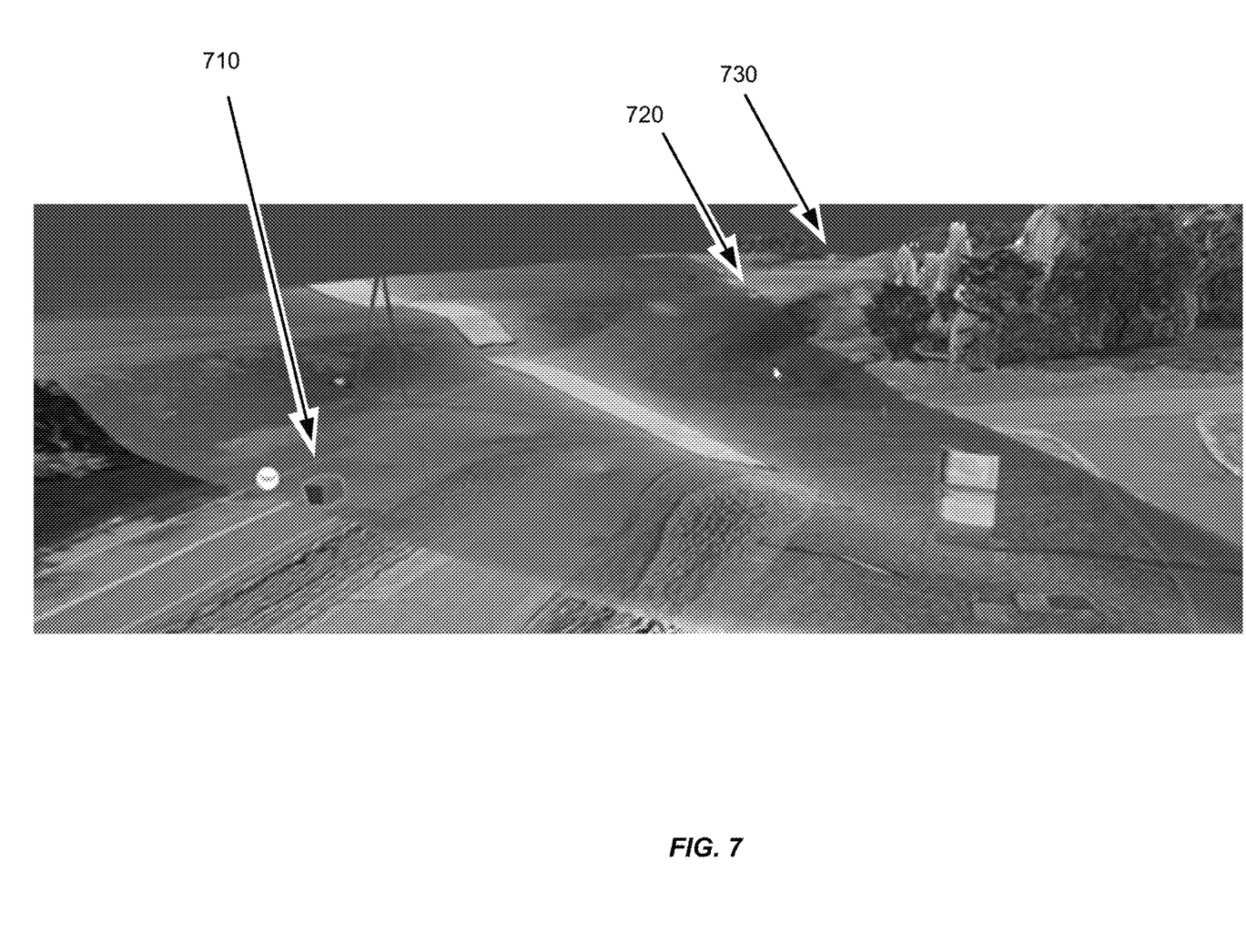
FIG. 7 shows another virtual scene of the 3D model viewed from another camera location, with the pixels of the video frame rendered onto the surfaces of the virtual objects in the 3D model, according to some embodiments of the present invention.

FIG. 7 shows another virtual scene of the 3D model viewed from another camera location. Here, it looks as though the image of the video frame is smeared on the surfaces of the objects in the virtual scene. The area of the virtual scene on which the video frame is rendered may be determined by the viewing frustum of the surveillance camera 460.

As discussed above, to create an animation sequence of the 3D model that corresponds to the video footage, a number of key frames may be identified in the video footage. In this example, a first key frame may correspond to the moment when the car 210 entered the video footage (e.g., shortly before the snapshot shown in FIG. 2A), and a second key frame may correspond to the moment when the car 210 exits the video footage (e.g., shortly after the snapshot shown in FIG. 2B).

As discussed above with reference to FIG. 1, after the key frames have been identified, the interpolator 130 of the virtual video projection system 100 may identify the location of the car 210 in each of the key frames, and place a virtual car in the 3D model at the same location in a corresponding virtual key frame of the animation sequence. For example, as illustrated in FIG. 7, in a first key frame of the video footage (e.g., frame number 258), the car 210 may be identified as at a first location 710, and in a second key frame of the video footage (e.g., frame number 320), the car 210 may be identified as at a second location 720. Thus, a virtual car may be placed at the first location 710 in a first virtual key frame, and at the second location 720 in a second virtual key frame.

Figure 8:
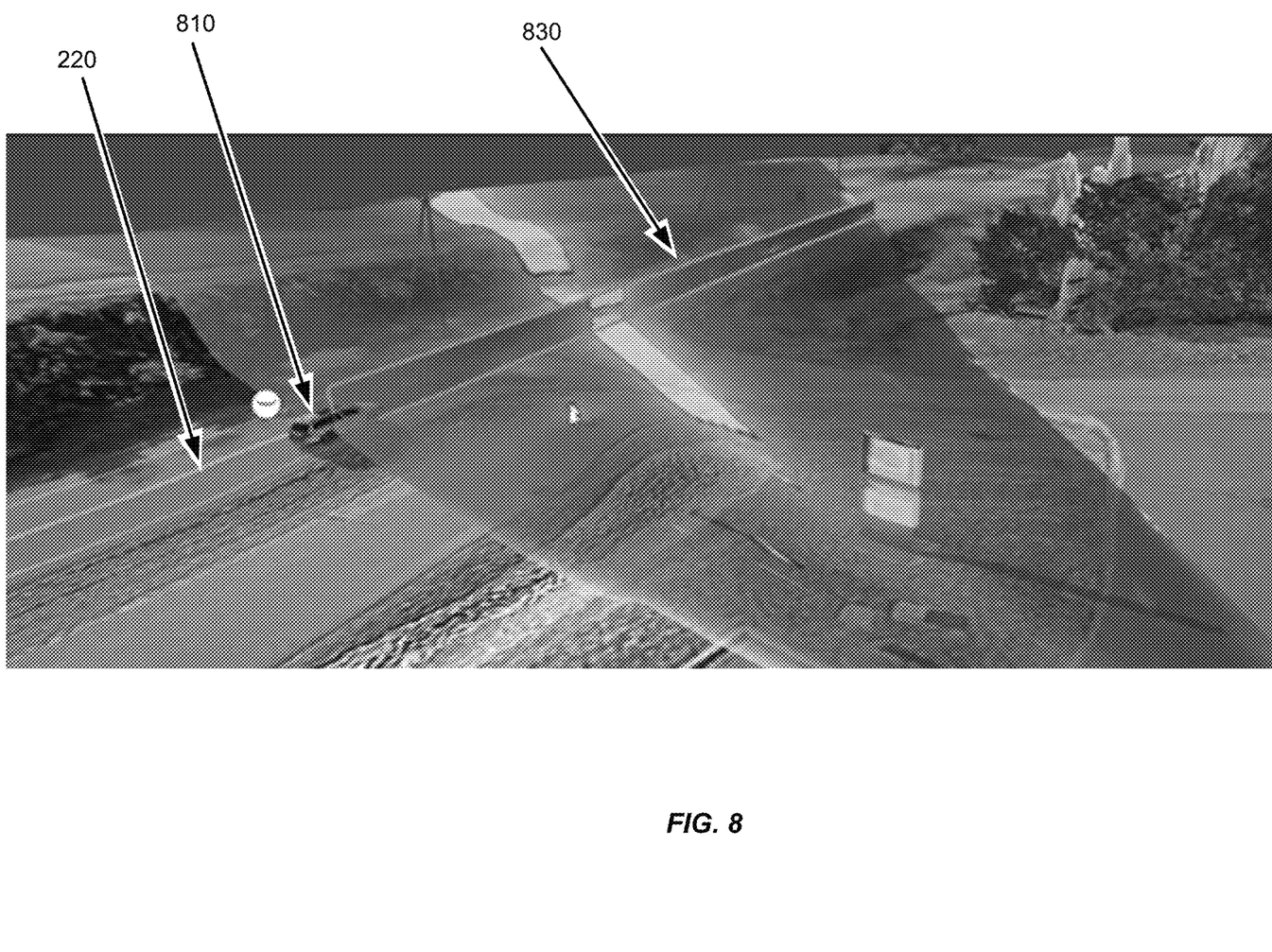
FIG. 8 shows a virtual scene of the 3D model, in which a vertical virtual wall is created to receive the video footage, according to some embodiments of the present invention.

Since the focus of reconstructing the crash scene may be on what was going on with the car 210 when it traveled through the road 220, the portion of the video images showing the road 220 may be of primary interest. Thus, according to some embodiments, a vertical virtual wall 830 (the area bounded by the orange rectangle) may be created at the road 220, as shown in FIG. 8. Also shown in FIG. 8 is a virtual car 810 placed on the road 220. Because the virtual wall 830 is vertical, it may be more suitable to receive the video footage as it is more compatible with where the car 210 was.

Figure 9:
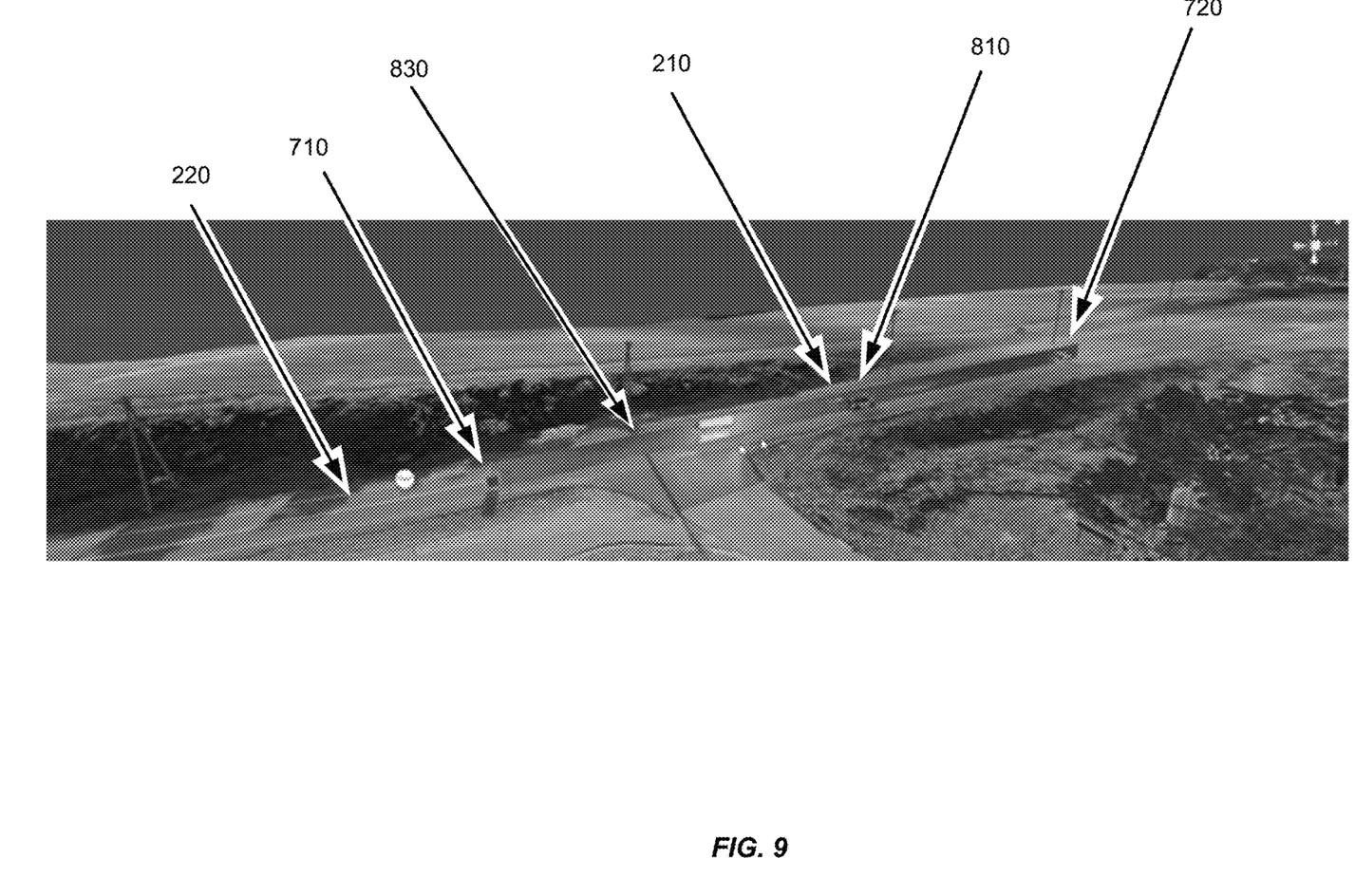
FIG. 9 shows a snapshot of an animation sequence, in which a virtual car travels through the road, and the video footage is rendered only on the vertical virtual wall, according to some embodiments of the present invention.

FIG. 9 shows a snapshot of an animation sequence in which the virtual car 810 travels through the road 220, and the video footage is rendered only on the vertical virtual wall 830. As discussed above with reference to FIG. 1, the key-frame timer 140 may feed the timings of the key frames into the projection module 120 to ensure that the animation sequence is played in synch with the video footage. Thus, as the animation sequence is played simultaneously with the video footage, the position of the virtual car 810 matches with the position of the car 210 in the video, as illustrated in the snapshot shown in FIG. 9.

Because the animation is synchronized with the video footage, it may be more convincing that the animation reflects what actually happened, and any information that may be extracted from the animation may be more credible. For instance, the speed of the car 210 may be determined from the animation as the virtual car 810 travels from the first position 710 to the second position 720.

Figure 10:
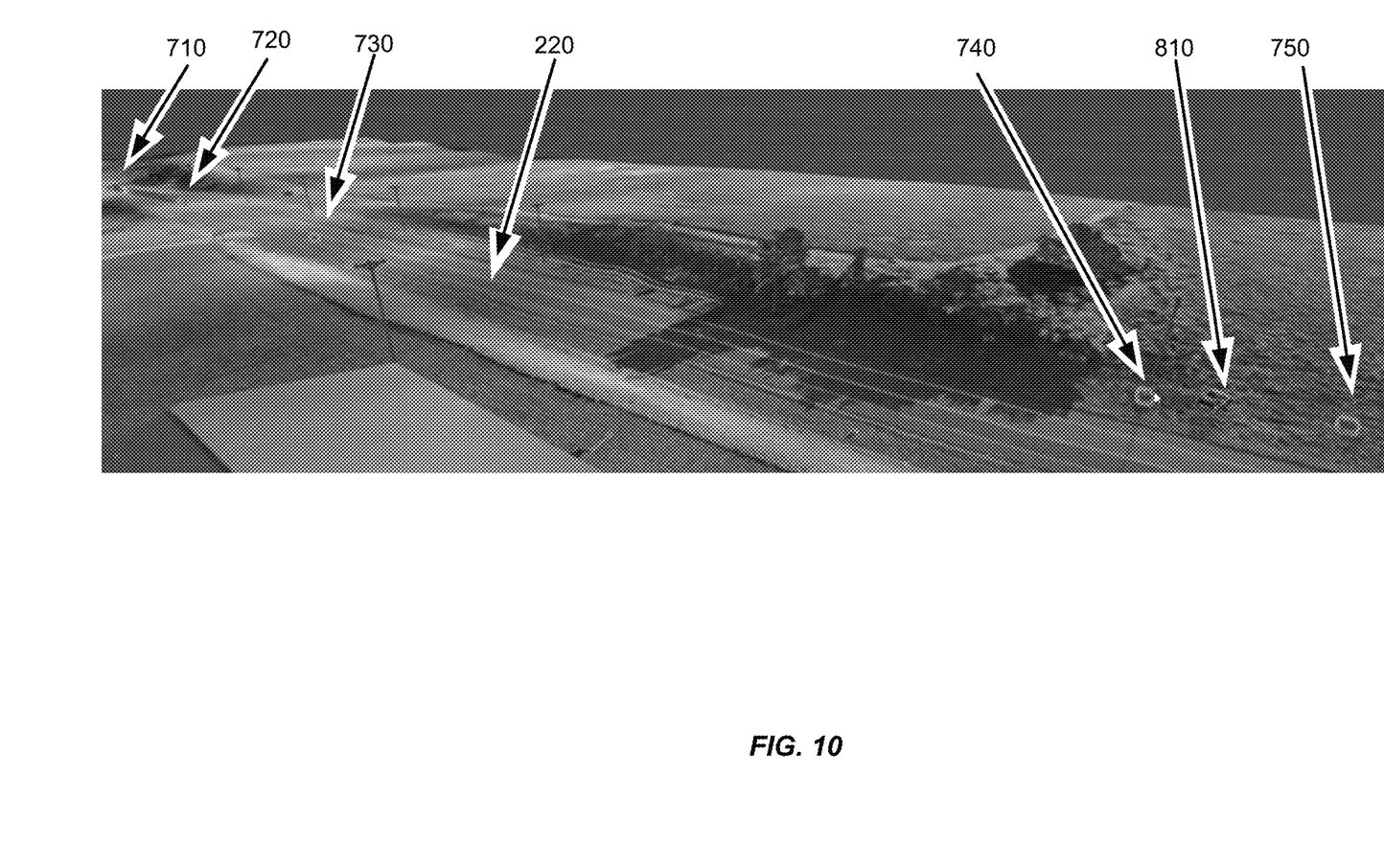
FIG. 10 shows another virtual scenes of the 3D model according to some embodiments of the present invention.

According to some embodiments, the virtual video projection system 100 may be used to re-create the sequence of events beyond what was captured in the surveillance video based on other evidence in the crash scene. For instance, as shown in FIG. 10, the spot 740 where the car 210 crashed can be known from the crash site. The timing of the crash corresponds to the video frame when the flash of light appeared on the video footage (as shown in FIG. 2C). Therefore, that video frame may be used as a third key frame for synchronizing the animation. The final position 740 and the orientation of the car 210 where the car 210 stopped can also be known from the crash site. In addition, a skid mark on the road 220 at the spot 730 where the car 210 lost control may also be determined from the crash site. Thus, an animation may re-create the entire sequence of events in which the virtual car 810 travels from the first position 710 to the second position 720, to where it lost control at the spot 730, to where it crashed at the spot 740, and to where it came to a stop at the spot 750.

According to some embodiments, an animation may be played from other vantage point different from the vantage point of the surveillance camera. For instance, as illustrated in FIG. 10, an animation may be played from an areal vantage point where the road 220 and the car 810 can be seen more clearly. As another example, an animation may be played from the vantage point of the driver by placing a virtual camera on the driver seat. Therefore, the virtual video projection system 100 can be a powerful tool for crime scene and accident reconstruction. By projecting a surveillance video onto a 3D model and synchronizing an animation with the surveillance video, it may be more credible that the animation correctly depicts the events unfolding in the surveillance video.

In some embodiments, a virtual object may be posed in various virtual key frames to correspond to the poses of a person in the corresponding key frames in a video. For instance, in the store burglary example, a virtual person may be posed to be waving his hand in one virtual key frame, and to be taking out a gun in another virtual key frame.

Figure 11:
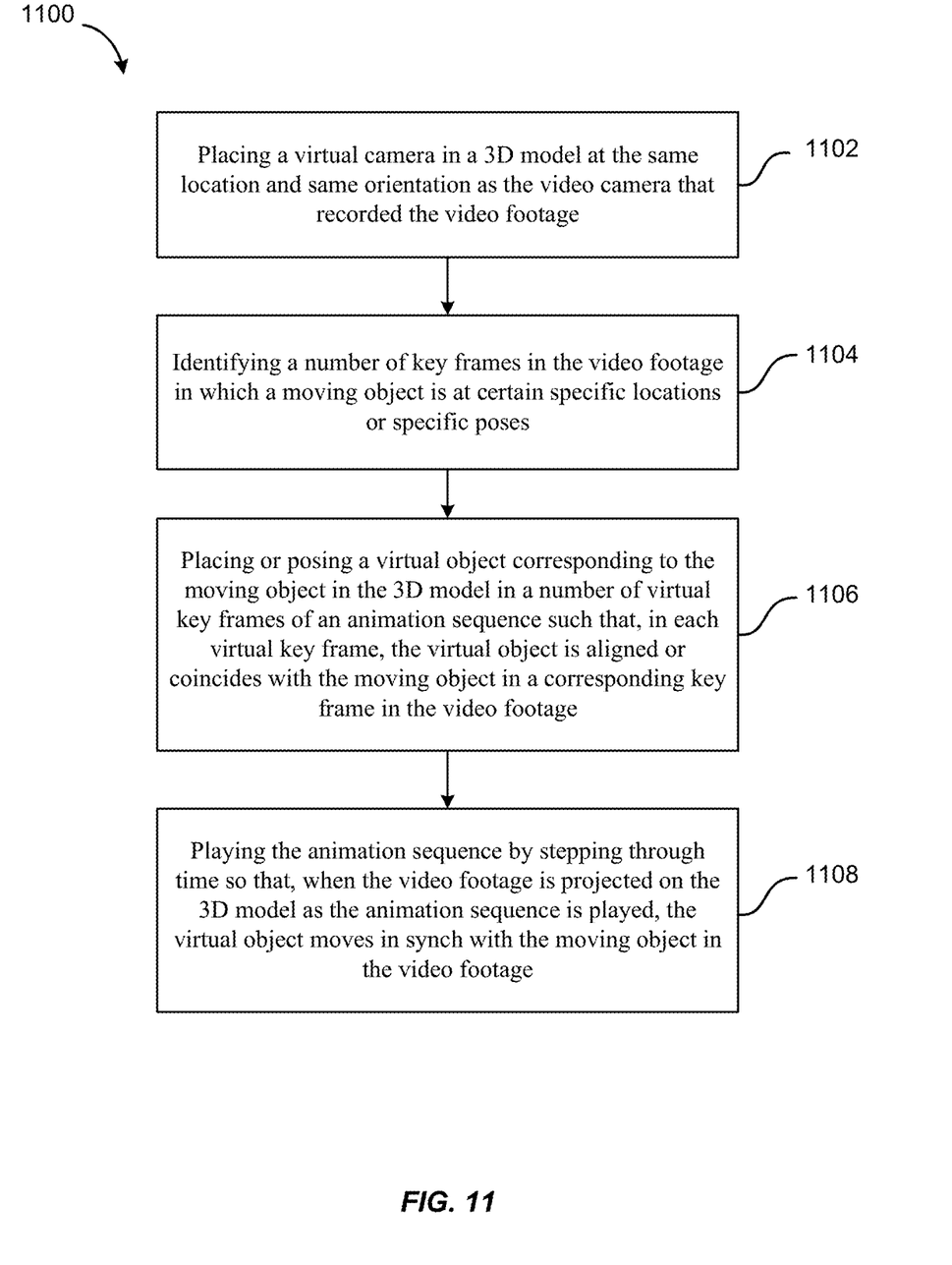
FIG. 11 shows a flowchart illustrating an exemplary workflow for creating an animation sequence synchronized with a video footage according to some embodiments.

FIG. 11 shows a flowchart illustrating an exemplary workflow 1100 for creating an animation sequence synchronized with a video footage according to some embodiments.

At 1102, a virtual camera is placed in a 3D model at the same location and the same orientation as the video camera that recorded the video footage. The virtual camera may have the same set of camera parameters, such as focal length and field of view, as those of the video camera. An animation sequence may be created in which virtual frames are obtained by projecting the 3D model onto a scene frame from the viewpoint of the virtual camera using the set of camera parameters.

At 1104, a number of key frames are identified in the video footage, in which a moving object is at certain specific locations or specific poses. For example, the moving object may be a car or a person.

At 1106, a virtual object corresponding to the moving object is placed or posed in the 3D model in a number of virtual key frames of an animation sequence such that, in each virtual key frame, the virtual object is aligned or coincides with the moving object in a corresponding key frame in the video footage.

At 1108, the animation sequence is played by stepping through time so that, when the video footage is projected on the 3D model as the animation sequence is played, the virtual object moves in synch with the moving object in the video footage.

Figure 12:
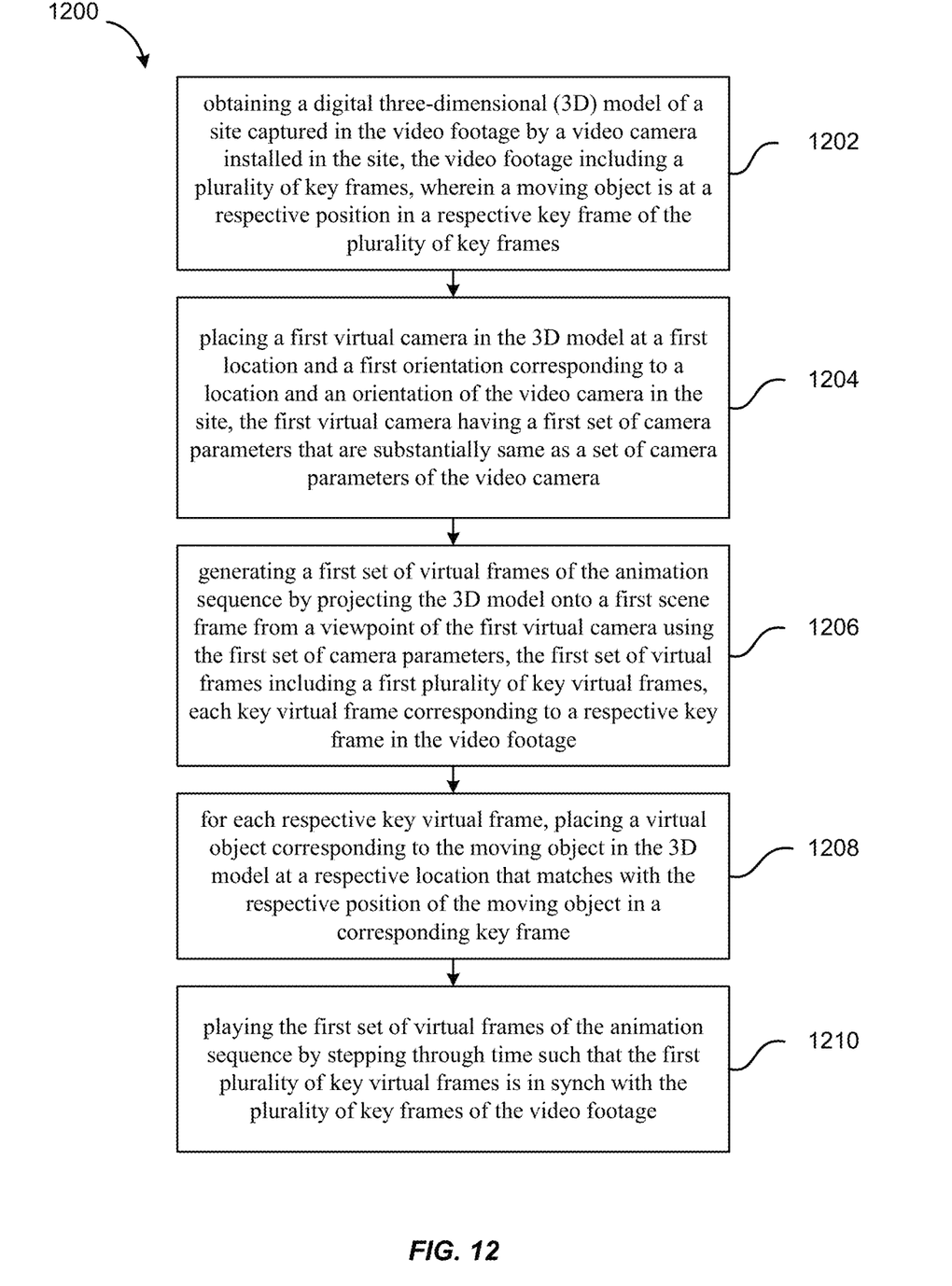
FIG. 12 shows a flowchart illustrating a method of synchronizing an animation sequence with a video footage according to some embodiments of the present invention.

FIG. 12 shows a flowchart illustrating a method 1200 of synchronizing an animation sequence with a video footage according to some embodiments of the present invention.

At 1202, a digital three-dimensional (3D) model of a site captured in the video footage is obtained. The video footage is recorded by a video camera installed in the site. The video footage includes a plurality of key frames. In each key frame, a moving object is at a respective position. The 3D model may be generated by scanning the site using a 3D scanner, or may be generated using computer graphics. The 3D model may be stored in a computer memory.

At 1204, a first virtual camera is placed in the 3D model at a first location and a first orientation that correspond to a location and an orientation of the video camera in the site. The first virtual camera may have a first set of camera parameters that are substantially same as a set of camera parameters of the video camera.

At 1206, a first set of virtual frames of the animation sequence is generated by projecting the 3D model onto a first scene frame from a viewpoint of the first virtual camera using the first set of camera parameters. The first set of virtual frames includes a first plurality of virtual key frames. Each virtual key frame corresponds to a respective key frame in the video footage.

At 1208, for each respective virtual key frame, a virtual object corresponding to the moving object is placed in the 3D model at a respective location that matches with the respective position of the moving object in a corresponding key frame.

At 1210, the first set of virtual frames of the animation sequence is played by stepping through time such that the first plurality of virtual key frames is in synch with the plurality of key frames of the video footage.

It should be appreciated that the specific steps illustrated in FIG. 12 provide a particular method of synchronizing an animation sequence with a video footage according to some embodiments of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of synchronizing an animation sequence with a video footage, the method comprising:
    obtaining a digital three-dimensional (3D) model of a site captured in the video footage by a video camera installed in the site, the video camera having a set of camera parameters;
    identifying a plurality of key frames of the video footage, wherein a moving object is at a respective position in a respective key frame of the plurality of key frames;
    placing a first virtual camera in the digital 3D model at a first location and a first orientation corresponding to a location and an orientation of the video camera in the site, the first virtual camera having a first set of virtual camera parameters, at least some virtual camera parameters of the first set of virtual camera parameters are same as some corresponding camera parameters of the set of camera parameters of the video camera;
    generating a first set of virtual frames of the animation sequence by projecting the digital 3D model onto a first scene frame from a viewpoint of the first virtual camera using the first set of virtual camera parameters, the first set of virtual frames including a first plurality of virtual key frames, each virtual key frame corresponding to a respective key frame in the video footage;
    rendering at least a subset of a set of pixels of the video footage in each virtual frame of the first set of virtual frames;
    for each respective virtual key frame, placing a virtual object corresponding to the moving object at a respective location in the digital 3D model that matches with the respective position of the moving object in a corresponding key frame; and
    playing the first set of virtual frames of the animation sequence while the video footage is overlaid on the subset of the set of pixels, wherein the animation sequence and the video footage are played simultaneously by stepping through time such that the first plurality of virtual key frames is in synch with the plurality of key frames of the video footage.

2. The method of claim 1 further comprising creating a virtual wall in the digital 3D model, and wherein the subset of the set of pixels of the video footage are rendered on the virtual wall.

3. The method of claim 1 wherein the first set of virtual camera parameters of the first virtual camera comprises a focal length and a field of view.

4. The method of claim 3 wherein the first set of virtual camera parameters of the first virtual camera further comprises calibration parameters.

5. The method of claim 1 wherein the digital 3D model of the site comprises a point cloud generated by scanning the site using a 3D scanner.

6. The method of claim 1 wherein the digital 3D model of the site is generated using computer graphics.

7. The method of claim 1 further comprising:
    placing a second virtual camera in the digital 3D model at a second location and a second orientation different from the first location and the first orientation, respectively;
    generating a second set of virtual frames of the animation sequence by projecting the digital 3D model onto a second scene frame from a viewpoint of the second virtual camera, the second set of virtual frames including a second plurality of virtual key frames corresponding to the plurality of key frames in the video footage; and
    playing the second set of virtual frames of the animation sequence by stepping through time such that the second plurality of virtual key frames is in synch with the plurality of key frames of the video footage.

8. The method of claim 7 wherein the second virtual camera has a second set of virtual camera parameters different from the first set of virtual camera parameters.

9. The method of claim 1 wherein the moving object has a respective pose in a respective key frame of the plurality of key frames, and the method further comprising, for each respective virtual key frame, posing the virtual object to match the respective pose of the moving object in a corresponding key frame.

10. A system for synchronizing an animation sequence with a video footage, the system comprising:
    a memory for storing a digital three-dimensional (3D) model of a site captured in the video footage by a video camera installed in the site, the video footage including a plurality of key frames, wherein a moving object is at a respective position in a respective key frame of the plurality of key frames, and the video camera having a set of camera parameters;
    a projection module configured to place a first virtual camera in the digital 3D model at a first location and a first orientation corresponding to a location and an orientation of the video camera in the site, the first virtual camera having a first set of virtual camera parameters, at least some virtual camera parameters of the first set of virtual camera parameters are same as some corresponding camera parameters of the set of camera parameters of the video camera;
    a processor configured to generate a first set of virtual frames of the animation sequence by projecting the digital 3D model onto a first scene frame from a viewpoint of the first virtual camera using the first set of virtual camera parameters, the first set of virtual frames including a first plurality of virtual key frames, each virtual key frame corresponding to a respective key frame in the video footage;
    a graphics shader configured to render at least a subset of a set of pixels of the video footage in each virtual frame of the first set of virtual frames;
    an interpolator configured to, for each respective virtual key frame, place a virtual object corresponding to the moving object at a respective location in the digital 3D model that matches with the respective position of the moving object in a corresponding key frame; and
    a key-frame timer for synchronizing playing of the first set of virtual frames of the animation sequence while the video footage is overlaid on the subset of the set of pixels such that the first plurality of virtual key frames is in synch with the plurality of key frames of the video footage.

11. The system of claim 10 wherein the processor is further configured to create a virtual wall in the digital 3D model, and wherein the subset of the set of pixels of the video footage are rendered on the virtual wall.

12. The system of claim 10 further comprising a display configured to play the first set of virtual frames of the animation sequence using the key-frame timer.

13. The system of claim 10 wherein the first set of virtual camera parameters of the first virtual camera comprises a focal length and a field of view.

14. The system of claim 13 wherein the first set of virtual camera parameters of the first virtual camera further comprises calibration parameters.

15. The system of claim 10 wherein the digital 3D model of the site comprises a point cloud generated by scanning the site using a 3D scanner.

16. The system of claim 10 wherein the digital 3D model of the site is generated using computer graphics.

17. The system of claim 10 wherein:
the projection module is further configured to place a second virtual camera in the digital 3D model at a second location and a second orientation different from the first location and the first orientation, respectively; and
the processor is further configured to generate a second set of virtual frames of the animation sequence by projecting the digital 3D model onto a second scene frame from a viewpoint of the second virtual camera.

18. The system of claim 10 wherein the moving object has a respective pose in a respective key frame of the plurality of key frames, and the interpolator is further configured to, for each respective virtual key frame, posing the virtual object to match the respective pose of the moving object in a corresponding key frame.

* * * * *